(12) United States Patent
Lee

(10) Patent No.: US 11,029,733 B2
(45) Date of Patent: Jun. 8, 2021

(54) DISPLAY DEVICE

(71) Applicant: SAMSUNG DISPLAY CO., LTD., Yongin-si (KR)

(72) Inventor: Jeena Lee, Anyang-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/843,233

(22) Filed: Apr. 8, 2020

(65) Prior Publication Data

US 2020/0348727 A1 Nov. 5, 2020

(30) Foreign Application Priority Data

May 3, 2019 (KR) .......................... 10-2019-0052476

(51) Int. Cl.
*G09F 9/30* (2006.01)
*G06F 1/16* (2006.01)

(52) U.S. Cl.
CPC .......... *G06F 1/1652* (2013.01); *G06F 1/1656* (2013.01); *G09F 9/301* (2013.01)

(58) Field of Classification Search
CPC combination set(s) only.
See application file for complete search history.

(56) References Cited

U.S. PATENT DOCUMENTS

| 6,873,315 B2* | 3/2005 | Hemia et al. ................. 345/156 |
| 7,180,665 B2* | 2/2007 | Daniel .................. G06F 1/1601 160/373 |
| 7,253,802 B2* | 8/2007 | Hemia .................. G06F 1/1615 345/156 |
| 7,559,163 B2* | 7/2009 | Ofuji ...................... G03B 21/58 160/265 |
| 7,907,337 B2* | 3/2011 | Daniel .................... G09F 9/301 359/461 |
| 7,965,258 B2* | 6/2011 | Aoki ...................... G06F 1/1641 345/1.3 |
| 8,199,471 B2* | 6/2012 | Bemelmans ............ G09F 11/29 361/679.21 |
| 8,379,377 B2* | 2/2013 | Walters ................. G06F 1/1652 361/679.04 |
| 8,493,714 B2* | 7/2013 | Visser ................... G06F 1/1613 361/679.01 |

(Continued)

FOREIGN PATENT DOCUMENTS

| KR | 10-1107127 | 1/2012 |
| KR | 10-2014-0059274 | 5/2014 |

(Continued)

*Primary Examiner* — Lisa Lea-Edmonds
(74) *Attorney, Agent, or Firm* — Lewis Roca Rothgerber Christie LLP

(57) ABSTRACT

A display device includes a display module including a first area and a second area, a support plate on a back surface of the display module and including a first support portion supporting the first area of the display module and a plurality of support bars supporting the second area, a case receiving the display module and the support plate and configured to control a size of an opening, exposing the display module, by a sliding operation, and a support unit coupled to the case and movable along the display module in the sliding operation to support the plurality of support bars.

20 Claims, 15 Drawing Sheets

(56) References Cited

U.S. PATENT DOCUMENTS

| | | | | |
|---|---|---|---|---|
| 8,493,726 | B2* | 7/2013 | Visser | G09F 9/301 |
| | | | | 361/679.3 |
| 8,711,566 | B2* | 4/2014 | O'Brien | G06F 1/1624 |
| | | | | 361/724 |
| 9,195,272 | B2* | 11/2015 | O'Brien | G06F 1/1624 |
| 9,286,812 | B2* | 3/2016 | Bohn | H01L 51/5237 |
| 9,519,313 | B2* | 12/2016 | Kim | G06F 1/166 |
| 9,678,539 | B2* | 6/2017 | Hayk | G06F 1/1652 |
| 9,772,657 | B2* | 9/2017 | Takayanagi | H04M 1/0268 |
| 9,823,697 | B2* | 11/2017 | Hsu | G06F 1/1652 |
| 10,025,355 | B2* | 7/2018 | Bohn | G06F 1/1652 |
| 10,101,019 | B2* | 10/2018 | Jahng | F21V 33/0052 |
| 10,111,346 | B2* | 10/2018 | Seo | H05K 1/189 |
| 10,136,524 | B2 | 11/2018 | Choi et al. | |
| 10,162,387 | B2* | 12/2018 | Takayanagi | G06F 1/1679 |
| 10,194,543 | B2* | 1/2019 | Seo | G06F 1/1626 |
| 10,209,742 | B2* | 2/2019 | Shin | G06F 1/1624 |
| 2008/0144265 | A1* | 6/2008 | Aoki | H04M 1/0268 |
| | | | | 361/679.04 |
| 2012/0212433 | A1* | 8/2012 | Lee | G06F 1/1652 |
| | | | | 345/173 |
| 2013/0128439 | A1* | 5/2013 | Walters | G06F 1/1641 |
| | | | | 361/679.04 |
| 2018/0014417 | A1* | 1/2018 | Seo | H05K 1/189 |
| 2019/0387633 | A1* | 12/2019 | Liao | H04M 1/0237 |
| 2020/0022269 | A1* | 1/2020 | Liao | H05K 5/0221 |
| 2020/0089279 | A1* | 3/2020 | Liao | G09G 5/005 |
| 2020/0192434 | A1* | 6/2020 | Huang | H04M 1/0235 |
| 2020/0249722 | A1* | 8/2020 | Cha | H04M 1/0268 |
| 2020/0264660 | A1* | 8/2020 | Song | G06F 1/1686 |
| 2020/0267246 | A1* | 8/2020 | Song | H05K 1/148 |

FOREIGN PATENT DOCUMENTS

| | | |
|---|---|---|
| KR | 10-2018-0006533 | 1/2018 |
| KR | 10-2018-0018941 | 2/2018 |

* cited by examiner

FIG. 4
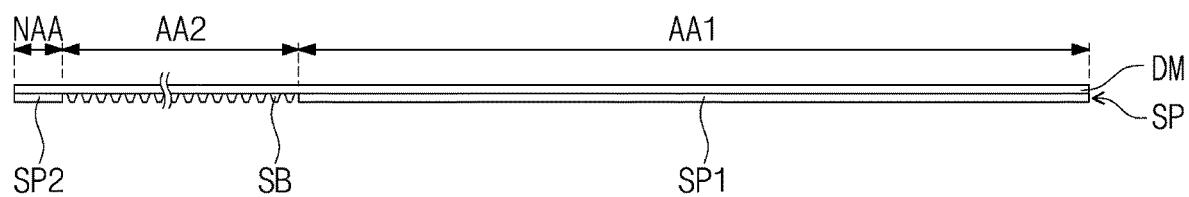
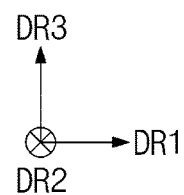

FIG. 7
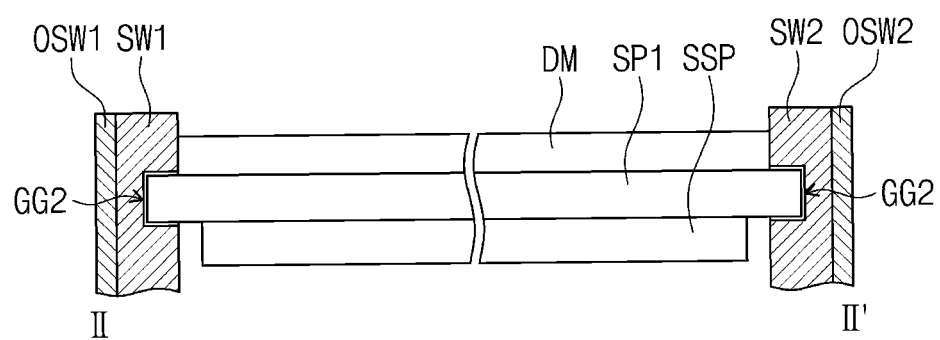
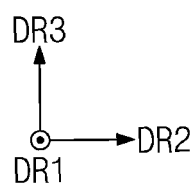

DISPLAY DEVICE

CROSS-REFERENCE TO RELATED APPLICATION

This application claims priority to and the benefit of Korean Patent Application No. 10-2019-0052476, filed on May 3, 2019 in the Korean Intellectual Property Office, the entire content of which is hereby incorporated by reference.

BACKGROUND

1. Field

Aspects of embodiments of the present disclosure herein relate to a display device.

2. Description of the Related Art

Typically, display devices for displaying images may be included in electronic devices for providing the images to users, such as smartphones, digital cameras, notebook computers, navigation systems, and smart televisions. The display devices may generate images and may provide the generated images to users through display screens.

The display devices having various shapes have been developed with the development of techniques. For example, flexible display devices that can be folded or rolled up have been developed. Since the flexible display devices can be variously modified in shape, they may be easily portable and may improve convenience to users.

An expandable flexible display device of flexible display devices may include a flexible display module. The flexible display module may be drawn out of a case as needed, and, thus, the expandable flexible display device may be expanded. A support plate may be disposed under the flexible display module to support the flexible display module.

SUMMARY

According to an aspect of embodiments of the present disclosure, a slidable display device is provided. According to another aspect of embodiments of the present disclosure, a display device capable of improving a function of supporting a display module is provided.

According to one or more embodiments of the inventive concepts, a display device includes: a display module including a first area and a second area; a support plate on a back surface of the display module and including a first support portion supporting the first area of the display module and a plurality of support bars supporting the second area; a case receiving the display module and the support plate and configured to control a size of an opening, exposing the display module, by a sliding operation; and a support unit coupled to the case and movable along the display module in the sliding operation to support the plurality of support bars.

In an embodiment, the case may include a first case to which the display module and the support plate are fixedly coupled, and a second case coupled to the first case to move in a direction away from or closer to the first case, which is parallel to a first direction. The support unit may be coupled to the second case.

In an embodiment, the support unit may include a plurality of support rollers supporting the plurality of support bars.

In an embodiment, a distance between support rollers of the plurality of support rollers may increase when the first case moves in a direction away from the second case, and the distance between the support rollers may decrease when the first case moves in a direction closer to the second case.

In an embodiment, the second case may include a sidewall portion slidingly coupled to the first case, and the sidewall portion may include a first stopping groove extending in the first direction.

In an embodiment, at least one of the plurality of support rollers may include a support pillar portion extending in a second direction perpendicular to the first direction, and a protrusion portion protruding from each of opposite ends of the support pillar portion. The protrusion portion may be received in the first stopping groove and may be movable in the first direction in the first stopping groove.

In an embodiment, the display device may further include a first link unit linking at least two support rollers of the plurality of support rollers to each other.

In an embodiment, the first link unit may include a first link bar, a first fixing portion connecting the first link bar to a first support roller of two support rollers adjacent to each other of the plurality of support rollers, and a second fixing portion connecting the first link bar to a second support roller of the two support rollers.

In an embodiment, the second support roller may include a movement groove receiving the second fixing portion, and a distance between the first and second support rollers may be adjusted depending on a position of the second fixing portion in the movement groove.

In an embodiment, the first case may include an outer sidewall portion slidingly coupled to the second case, and a sub-support plate supporting the first support portion of the support plate.

In an embodiment, the display device may further include a second link unit linking the sub-support plate to an adjacent support roller of the plurality of support rollers, which is closest to the sub-support plate.

In an embodiment, the second link unit may include a second link bar, a third fixing portion connecting the second link bar to the adjacent support roller, and a fourth fixing portion connecting the second link bar to the sub-support plate.

In an embodiment, the sub-support plate may include a second stopping groove receiving the fourth fixing portion, and a distance between the adjacent support roller and the sub-support plate may be adjusted depending on a position of the fourth fixing portion in the second stopping groove.

BRIEF DESCRIPTION OF THE DRAWINGS

The accompanying drawings are included to provide a further understanding of the inventive concepts, and are incorporated in and constitute a part of this specification. The drawings illustrate some example embodiments of the inventive concepts and, together with the description, serve to explain principles of the inventive concepts. In the drawings:

FIG. 4 is a side view illustrating the display module and the support plate of FIG. 3;

FIG. 7 is a cross-sectional view taken along the line II-II' of FIG. 1;

DETAILED DESCRIPTION

Figure 1:
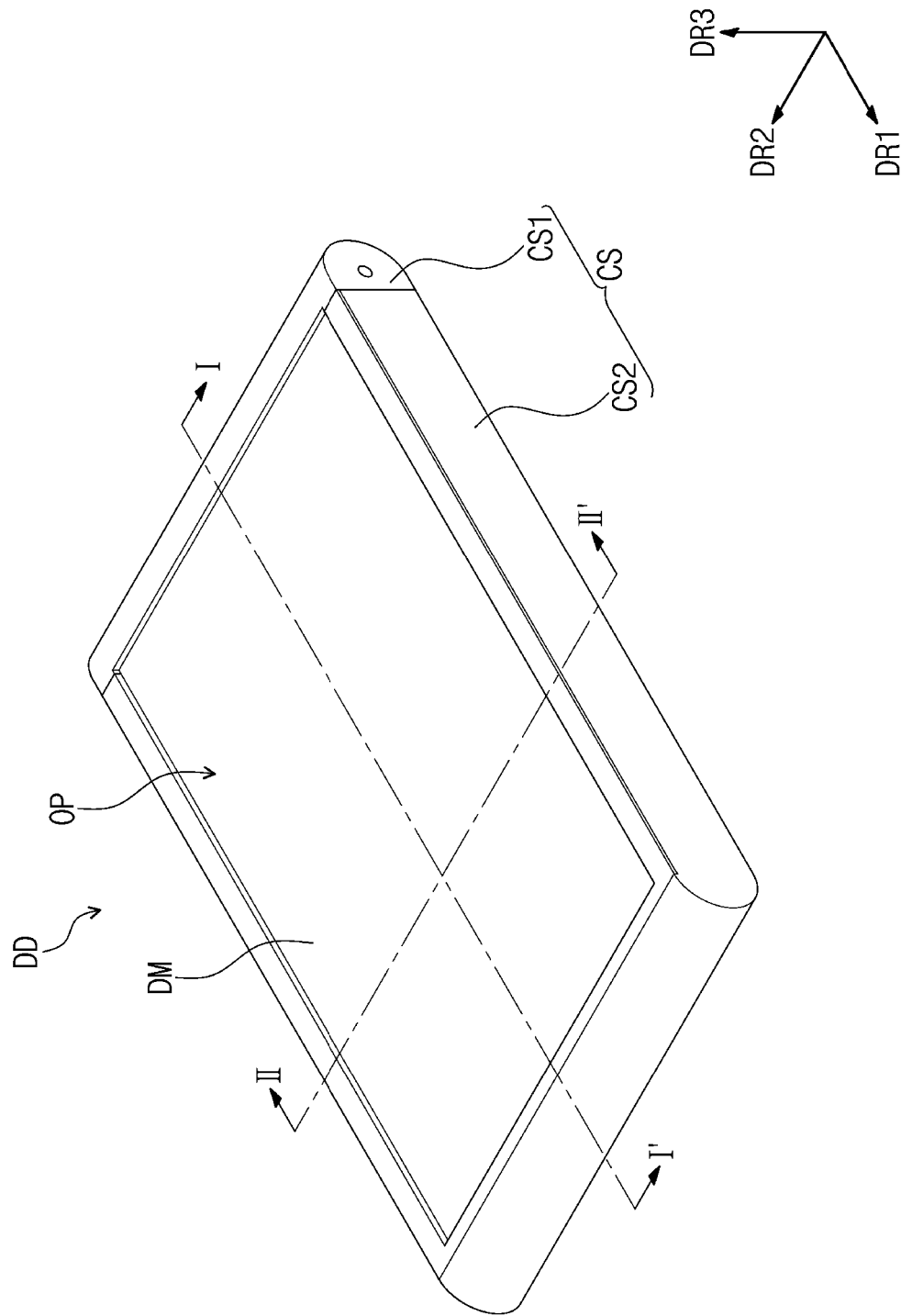
FIG. 1 is a perspective view illustrating a display device according to an embodiment of the inventive concepts.

The inventive concepts now will be described more fully herein with reference to the accompanying drawings, in which various embodiments are shown. The inventive concepts may, however, be embodied in many different forms, and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout.

It is to be understood that when an element, such as a layer, region, or substrate is referred to as being "on" another element, it may be directly on the other element or one or more intervening elements may be present. In contrast, the term "directly" means that there are no intervening elements.

The terminology used herein is for the purpose of describing particular embodiments and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It is to be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

It is to be understood that, although the terms "first," "second," etc. may be used herein to describe various elements, components, regions, layers, and/or sections, these elements, components, regions, layers, and/or sections should not be limited by these terms. These terms are used to distinguish one element, component, region, layer, or section from another region, layer, or section. Thus, a first element, component, region, layer, or section discussed below could be termed a second element, component, region, layer, or section without departing from the teachings herein.

"About" or "approximately" as used herein are inclusive of the stated value and mean within an acceptable range of deviation for the particular value as determined by one of ordinary skill in the art, considering the measurement in question and the error associated with measurement of the particular quantity (e.g., the limitations of the measurement system).

Some example embodiments are described herein with reference to cross-sectional illustrations and/or plane illustrations that may be idealized exemplary illustrations. In the drawings, the thicknesses of layers and regions may be exaggerated for clarity. Accordingly, variations from the shapes of the illustrations as a result, for example, of manufacturing techniques and/or tolerances, are to be expected. Thus, embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures may be schematic in nature and their shapes are not necessarily intended to illustrate the actual shape of a region of a device and are not intended to limit the scope of embodiments.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, some example embodiments of the inventive concepts will be described in further detail with reference to the accompanying drawings.

Figure 2:
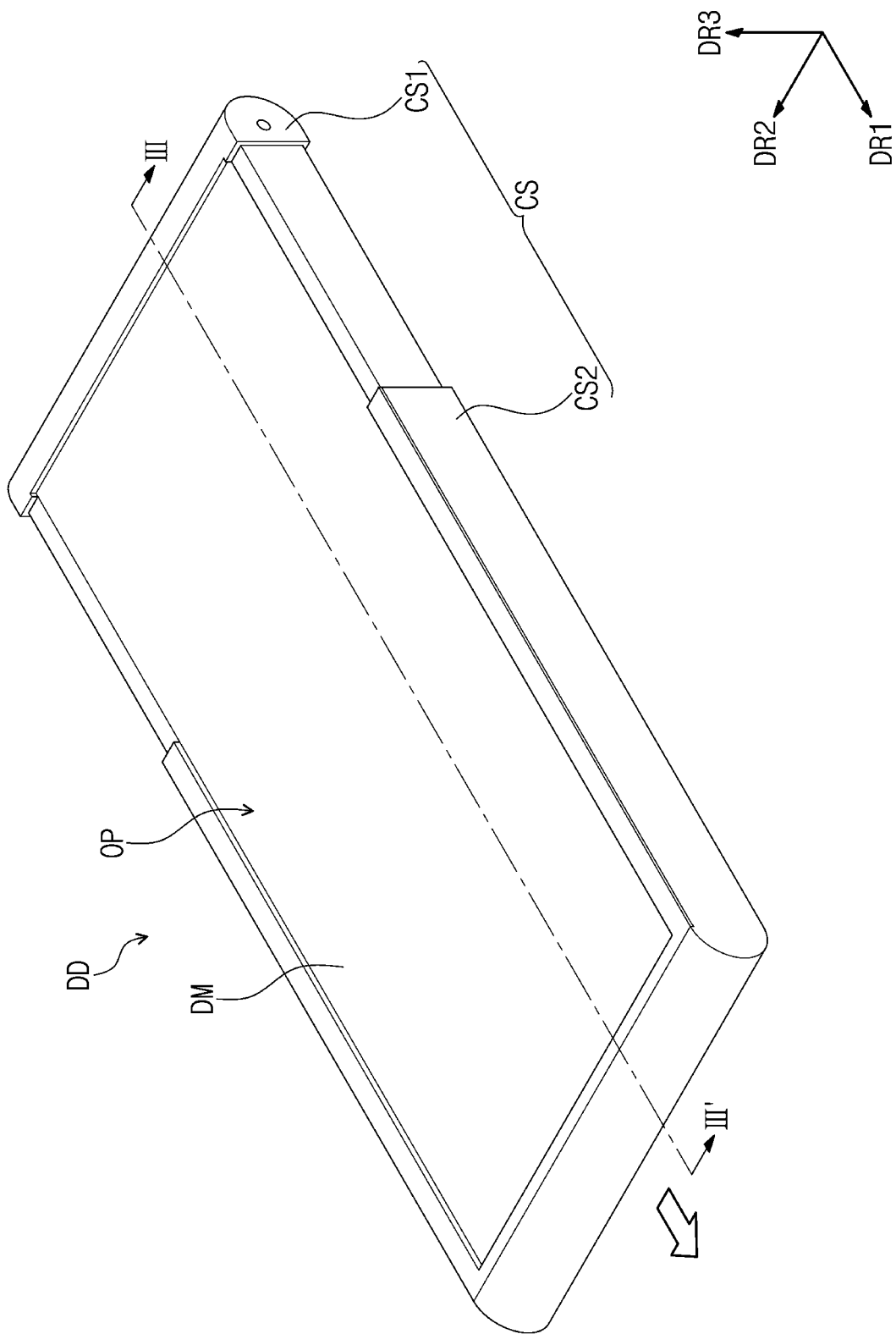
FIG. 2 is a perspective view illustrating an expanded mode of the display device of FIG. 1.

FIG. 1 is a perspective view illustrating a display device according to an embodiment of the inventive concepts; and FIG. 2 is a perspective view illustrating an expanded mode of the display device of FIG. 1.

Referring to FIG. 1, a display device DD according to an embodiment of the inventive concepts may include a display module DM and a case CS in which the display module DM is received. The display module DM may be exposed to the outside through an opening OP defined in an upper portion of the case CS.

The case CS may include a first case CS1 and a second case CS2. The first case CS1 and the second case CS2 may be coupled to each other to receive the display module DM. The first case CS1 may be coupled to the second case CS2 in such a way that the first case CS1 is movable (e.g., relative to the second case CS2) in a first direction DR1.

Herein, a direction intersecting, or substantially perpendicular to, the first direction DR1 may be defined as a second direction DR2. A direction substantially perpendicular to a plane defined by the first and second directions DR1 and DR2 may be defined as a third direction DR3. In the present specification, it may be understood that when one or more components are viewed in a plan view, the components may be viewed in a direction opposite to the third direction DR3.

Components or features of the first and second cases CS1 and CS2 will be described later in further detail with reference to FIG. 6.

Referring to FIG. 2, an area (or size) of an exposed surface (i.e., a display surface exposed through the opening OP of the case CS) of the display module DM may be adjusted depending on movement of the first case CS1. For example, the display module DM may be a flexible display module and may be supported by a support plate SP (see FIG. 3) disposed under the display module DM. The support plate SP may be connected to the first case CS1. When the first case CS1 moves in the first direction DR1, the support plate SP may also move in the first direction DR1.

Although not shown in the drawings, except for the portion (i.e., the display surface DS (see FIG. 3)) of the display module DM exposed through the opening OP, another portion of the display module DM which is not exposed to the outside may be disposed in the second case CS2. A size of the opening OP may be increased in the first direction DR1 by the movement of the first case CS1. In addition, the display module DM disposed on the support plate SP may move together with the support plate SP in the first direction DR1 by the movement of the first case CS1, and, thus, the exposed surface (i.e., the display surface DS) of the display module DM exposed through the opening OP may also be expanded. As a result, a user may view an image through an expanded display surface DS.

Herein, as illustrated in FIG. 1, a state of the display device DD in which the display surface DS of the display module DM is set to a basic, or non-expanded, size may be defined as a basic mode. As illustrated in FIG. 2, a state of the display device DD in which the display surface DS of the display module DM is expanded may be defined as an expanded mode.

Figure 3:
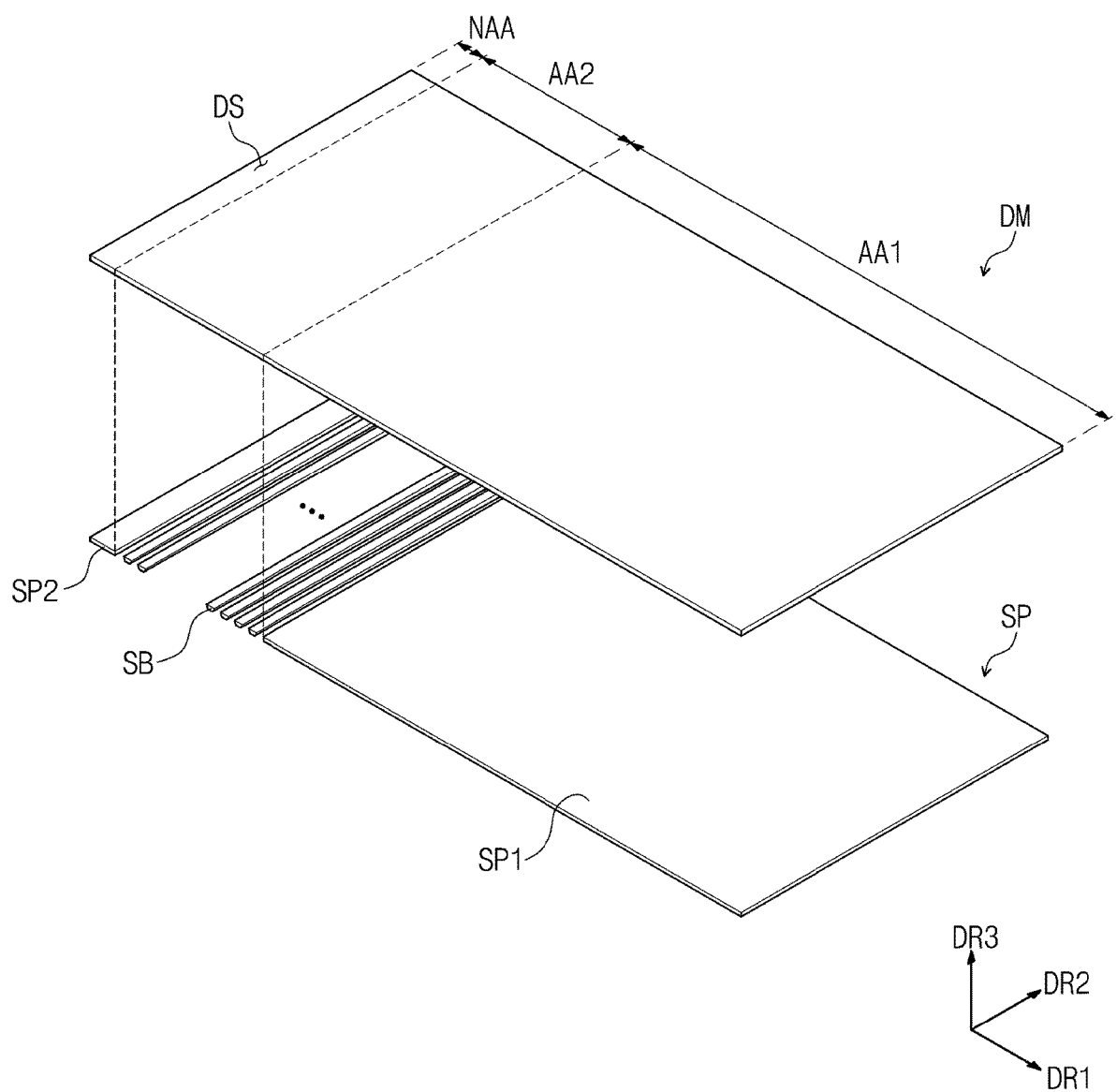
FIG. 3 is an exploded perspective view illustrating a display module and a support plate supporting the display module, of the display device illustrated in FIG. 1.

FIG. 3 is an exploded perspective view illustrating a display module and a support plate supporting the display module, of the display device illustrated in FIG. 1; and FIG. 4 is a side view illustrating the display module and the support plate of FIG. 3.

For the purpose of ease and convenience in description, FIG. 4 illustrates the display module DM and the support plate SP which are coupled to each other. In addition, FIG. 4 illustrates a side view of the display module DM and the support plate SP, which is viewed in the second direction DR2.

Referring to FIGS. 2 and 3, the display surface DS of the display module DM may include a first area AA1, a second area AA2, and a third area NAA. The first area AA1 of the display surface DS may have a size corresponding to that of the opening OP of FIG. 1 in the basic mode and may determine a screen size in the basic mode. In other words, in the basic mode, the opening OP may expose the first area AA1 of the display surface DS, and the second and third areas AA2 and NAA may not be exposed through the opening OP. In another embodiment, in the basic mode, the opening OP may expose the first area AA1 and a portion of the second area AA2.

The second area AA2 may be adjacent to the first area AA1. When the display device DD operates in the expanded mode, a portion of the second area AA2, as well as the first area AA1, may be exposed by the opening OP. In other words, the screen size of the display device DD may be increased by an area (or size) of the exposed portion of the second area AA2.

The third area NAA may be adjacent to the second area AA2. In other words, the second area AA2 may be defined between the first area AA1 and the third area NAA. The third area NAA may be an area (e.g., an ineffective area) that is not used as the screen of the display device DD.

The support plate SP may be disposed under the display module DM. The support plate SP may be formed of a material having higher rigidity than that of the display module DM. For example, the support plate SP may be formed of a metal material, such as aluminum. The support plate SP may include a first support portion SP1, a plurality of support bars SB, and a second support portion SP2. The first support portion SP1 may support the first area AA1 of the display module DM, and the plurality of support bars SB may support the second area AA2 of the display module DM. The second support portion SP2 may support the third area NAA of the display module DM.

The plurality of support bars SB may be disposed between the first support portion SP1 and the second support portion SP2. The plurality of support bars SB may extend in the second direction DR2 and may be arranged in the first direction DR1. The plurality of support bars SB may be spaced apart from each other in the first direction DR1. In an embodiment, each of the plurality of support bars SB may have an inverted trapezoidal shape with respect to the display surface DS of the display module DM when viewed in the second direction DR2.

The support bars SB spaced apart from each other in the first direction DR1 are illustrated as an example. However, the structure of the support bars SB is not limited thereto. In another embodiment, the support bars SB may be coupled to each other through a joint structure to rotate with respect to each other.

The first support portion SP1 may have a plane defined by the first and second directions DR1 and DR2. The first support portion SP1 may have a size corresponding to that of the first area AA1 of the display module DM.

The second support portion SP2 may extend in the second direction DR2. In an embodiment, the second support portion SP2 may have a rectangular shape that has long sides extending in the second direction DR2 and short sides extending in the first direction DR1. The second support portion SP2 may have a size corresponding to that of the third area NAA of the display module DM.

Referring to FIGS. 3 and 4, the support plate SP may be disposed under the display module DM to support the display module DM. The support plate SP may be disposed on a back surface of the display module DM, which is opposite to the display surface DS.

The first support portion SP1 may be disposed on the back surface, opposite to the display surface DS, of the display module DM to support the first area AA1 of the display module DM. The plurality of support bars SB and the second support portion SP2 may be disposed on the back surface of the display module DM to support the second area AA2 and the third area NAA.

Although not shown in the drawings, an adhesive may be disposed between the display module DM and the support plate SP to adhere the support plate SP to the back surface of the display module DM. For example, the adhesive may include a pressure sensitive adhesive. However, embodiments of the inventive concepts are not limited thereto. In certain embodiments, the adhesive may include at least one of other various adhesives.

Figure 5:
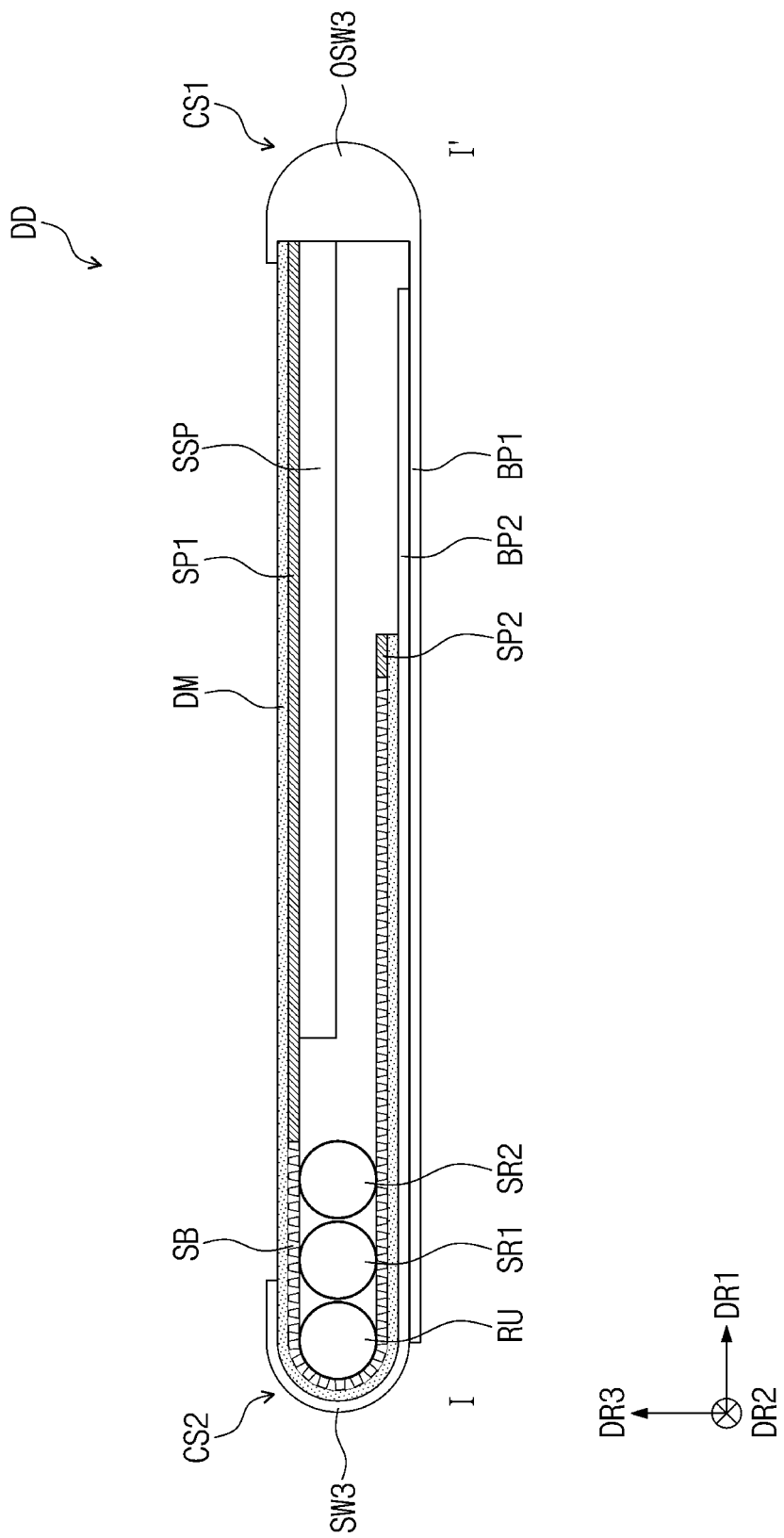
FIG. 5 is a cross-sectional view taken along the line I-I' of FIG. 1.

FIG. 5 is a cross-sectional view taken along the line I-I' of FIG. 1; FIG. 6 is an exploded perspective view illustrating a first case, a second case, a rotation unit, and a support unit of FIG. 5; and FIG. 7 is a cross-sectional view taken along the line II-II' of FIG. 1.

Figure 6:
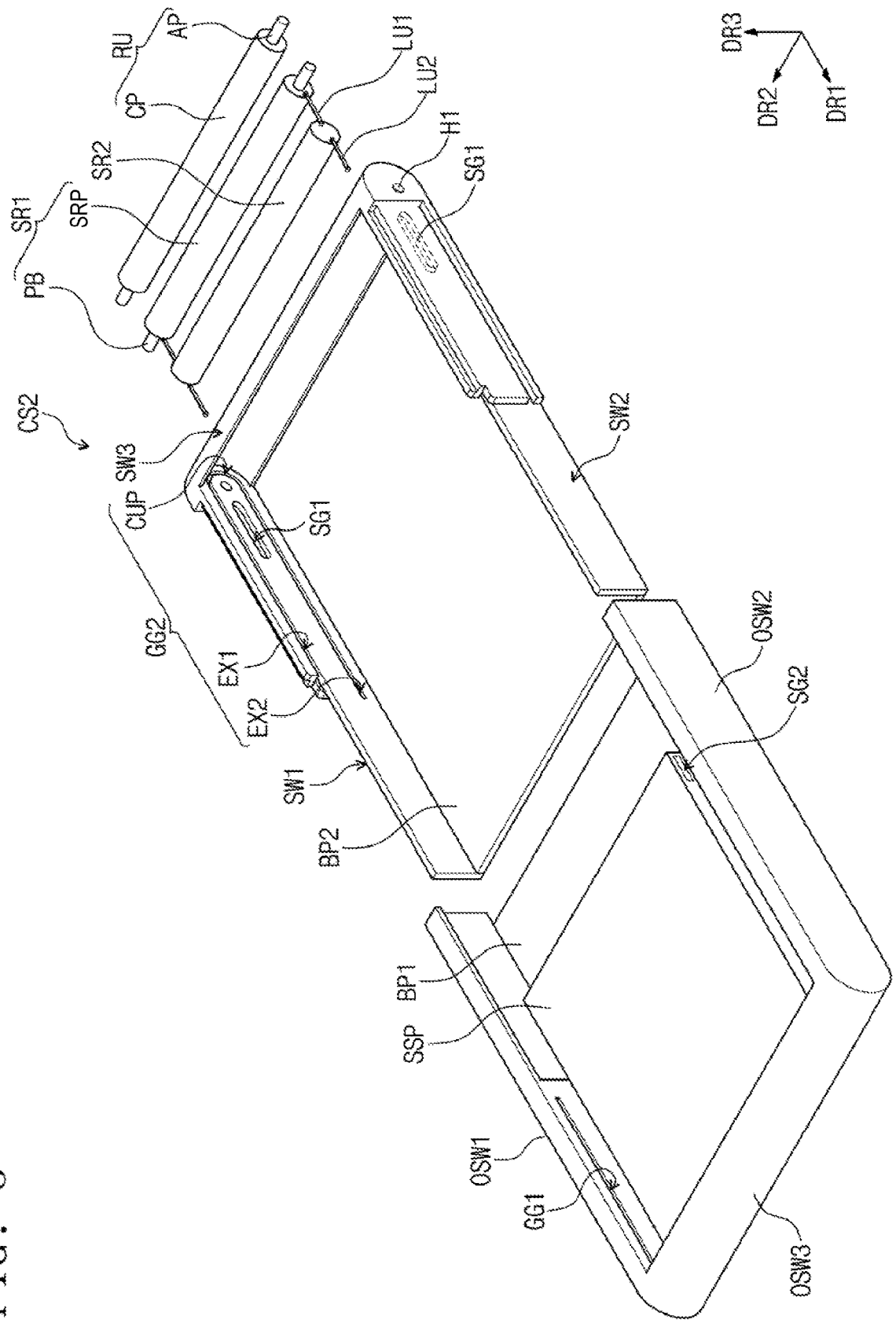
FIG. 6 is an exploded perspective view illustrating a first case, a second case, a rotation unit, and a support unit of FIG. 5.

Referring to FIGS. 5 and 6, the display device DD may include the display module DM, the case CS receiving the display module DM, a rotation unit RU, and a support unit SU. The case CS may include the first case CS1 and the second case CS2. The first case CS1 and the second case CS2 may be coupled to each other to receive the display module DM. The first case CS1 may be coupled to the second case CS2 in such a way that the first case CS1 is movable in the first direction DR1.

The first case CS1 may include a first outer sidewall portion OSW1, a second outer sidewall portion OSW2, a third outer sidewall portion OSW3, and a first bottom portion BP1. The first outer sidewall portion OSW1 and the second outer sidewall portion OSW2 may extend in the first direction DR1. The second outer sidewall portion OSW2 may face the first outer sidewall portion OSW1 in the second direction DR2. In an embodiment, the first outer sidewall portion OSW1 may have substantially the same shape as the second outer sidewall portion OSW2.

The first case CS1 may further include a guide portion. The guide portion is provided at each of inner side surfaces of the first and second outer sidewall portions OSW1 and OSW2 facing each other and is coupled to the second case CS2 to guide the movement in the first direction DR1. In an embodiment, for example, the guide portion may be a protrusion protruding from the inner side surface.

In an embodiment, a first guide groove GG1 may be provided in each of the inner side surfaces of the first and second outer sidewall portions OSW1 and OSW2. Both, or opposite, ends of the support plate SP may be inserted in the first guide grooves GG1.

One side of each of the first and second outer sidewall portions OSW1 and OSW2 may be substantially a portion being in contact with the second case CS2 when the first and second cases CS1 and CS2 are coupled to each other. The one side of each of the first and second outer sidewall portions OSW1 and OSW2 may be defined as an end of each of the first and second outer sidewall portions OSW1 and OSW2. Herein, another side, opposite to the one side, of each of the first and second outer sidewall portions OSW1 and OSW2 may be defined as the other side of each of the first and second outer sidewall portions OSW1 and OSW2.

The third outer sidewall portion OSW3 may extend in the second direction DR2 and may be disposed between the other side of the first outer sidewall portion OSW1 and the other side of the second outer sidewall portion OSW2. In an embodiment, an outer surface of the third outer sidewall portion OSW3 may have a curved surface shape which is convex toward the outside.

The first bottom portion BP1 may have a plane defined by the first and second directions DR1 and DR2. The first bottom portion BP1 may extend from a bottom end of the first outer sidewall portion OSW1, a bottom end of the second outer sidewall portion OSW2, and a bottom end of the third outer sidewall portion OSW3.

The first case CS1 may further include a sub-support plate SSP supporting the first support portion SP1 of the support plate SP. One end of the sub-support plate SSP may be fixedly coupled to the third outer sidewall portion OSW3 of the first case CS1. The sub-support plate SSP may partially overlap with the first support portion SP1. In other words, the sub-support plate SSP may support a portion of the first support portion SP1.

The second case CS2 may include a first sidewall portion SW1, a second sidewall portion SW2, a third sidewall portion SW3, and a second bottom portion BP2. The first sidewall portion SW1 and the second sidewall portion SW2 may extend in the first direction DR1. The second sidewall portion SW2 may face the first sidewall portion SW1 in the second direction DR2. In an embodiment, the first sidewall portion SW1 may have substantially the same shape as the second sidewall portion SW2.

In an embodiment, a second guide groove GG2 may be defined in each of inner side surfaces of the first and second sidewall portions SW1 and SW2 which face each other. The inner side surfaces of the first and second sidewall portions SW1 and SW2 may define inner side surfaces of the second case CS2, which face each other.

The second guide groove GG2 defined in the inner side surface of the first sidewall portion SW1 is illustrated in FIG. 6. However, the second guide groove GG2 may also be defined in the inner side surface of the second sidewall portion SW2.

The second guide groove GG2 may include a first extension groove EX1, a second extension groove EX2, and a curved groove CUP. The first extension groove EX1 may extend in the first direction DR1. The second extension groove EX2 may extend in the first direction DR1 and may be disposed under the first extension groove EX1.

In an embodiment, for example, a length of the second extension groove EX2 in the first direction DR1 may be greater than a length of the first extension groove EX1 in the first direction DR1, as illustrated in FIG. 6. However, the relation of the lengths of the first and second extension grooves EX1 and EX2 is not limited thereto. When the first and second cases CS1 and CS2 are coupled to or engaged with each other, the first extension groove EX1 may be disposed on a same line as the first guide groove GG1 formed in the first case CS1.

The curved groove CUP may extend from one end of the first extension groove EX1 to one end of the second extension groove EX2 and may have a curved shape. The curved groove CUP may be adjacent to one of both sides of the second case CS2 opposite to each other in the first direction DR1.

The one end of the first extension groove EX1 and the one end of the second extension groove EX2 may be adjacent to the one side of the second case CS2. The curved groove CUP may have a curved shape which is convex toward the one side of the second case CS2.

The third sidewall portion SW3 may define the one side of the second case CS2. The third sidewall portion SW3 may extend in the second direction DR2 and may be disposed between one side of the first sidewall portion SW1 and one side of the second sidewall portion SW2. In an embodiment, an outer surface of the third sidewall portion SW3 may have a curved surface shape which is convex toward the outside. An inner surface of the third sidewall portion SW3, which is opposite to the outer surface of the third sidewall portion SW3, may have a concave curved surface shape.

The second bottom portion BP2 may have a plane defined by the first and second directions DR1 and DR2. The second bottom portion BP2 may extend from a bottom end of the first sidewall portion SW1, a bottom end of the second sidewall portion SW2, and a bottom end of the third sidewall portion SW3.

The rotation unit RU may have a cylindrical shape extending in the second direction DR2. In an embodiment, the rotation unit RU may include a shaft portion AP extending in the second direction DR2 and a pillar portion CP surrounding the shaft portion AP. A diameter of the shaft portion AP may be less than a diameter of the pillar portion CP when viewed in the second direction DR2. Both ends of the shaft portion AP may be exposed from both sides of the pillar portion CP, respectively. The rotation unit RU may be rotatable on or about the shaft portion AP.

The rotation unit RU may be disposed in the second case CS2 and may be coupled to the second case CS2. For example, both ends of the rotation unit RU may be inserted in first holes H1 defined in the first and second sidewall portions SW1 and SW2, respectively, and thus may be coupled to the second case CS2. In further detail, both ends of the shaft portion AP may be inserted in the first holes H1 defined in the first and second sidewall portions SW1 and SW2, respectively. One of the first holes H1 may be adjacent to the one side of the first sidewall portion SW1 and another of the first holes H1 may be adjacent to the one side of the second sidewall portion SW2. The rotation unit RU may be rotatable while both ends of the rotation unit RU are coupled to the second case CS2.

The support bars SB may be arranged in a curved form along an outer surface of the rotation unit RU. In other words, some of the support bars SB may be disposed on an upper portion of the rotation unit RU, others of the support bars SB may be disposed on a side portion of the rotation unit RU, and still others of the support bars SB may be disposed under a lower portion of the rotation unit RU.

When the first case CS1 moves, the support bars SB may be moved by rotation of the rotation unit RU. In other words, when the first case CS1 moves in the first direction DR1, the support bars SB located on the side portion and under the lower portion of the rotation unit RU may be moved onto the upper portion of the rotation unit RU by the rotation of the rotation unit RU.

The support unit SU may be received in the second case CS2. The support unit SU may be disposed between the first sidewall portion SW1 and the second sidewall portion SW2. The support unit SU may be adjacent to the third sidewall portion SW3.

The support unit SU may include first and second support rollers SR1 and SR2. Each of the first and second support rollers SR1 and SR2 may have a cylindrical shape extending in the second direction DR2.

The first support roller SR1 may include a first support pillar portion SRP extending in the second direction DR2, and protrusion portions PB (e.g., protrusion bars) protruding from both, or opposite, ends of the first support pillar portion SRP, respectively. A diameter of the protrusion portion PB may be less than a diameter of the first support pillar portion SRP when viewed in the second direction DR2.

A first stopping groove SG1 may be provided in each of the first and second sidewall portions SW1 and SW2 of the second case CS2. The first stopping groove SG1 may be disposed between the first extension groove EX1 and the second extension groove EX2. The first stopping groove SG1 may receive the protrusion portion PB and may function as a stop for limiting movement of the first support roller SR1.

The second support roller SR2 may include a second support pillar portion extending in the second direction DR2.

Referring to FIGS. 5 to 7, the display module DM and the support plate SP may be received in the first and second cases CS1 and CS2 in a state in which the display module DM and the support plate SP are folded along the rotation unit RU. Both end portions of the support plate SP may be disposed in the first and second guide grooves GG1 and GG2. In the basic mode, the first support portion SP1 of the support plate SP may be disposed in the first guide grooves GG1 and the first extension grooves EX1 to support the first area AA1 of the display module DM. In the basic mode, the support bars SB may be disposed in the curved grooves CUP and the second extension grooves EX2 to support the folded portion (i.e., the second area AA2) of the display module DM.

The sub-support plate SSP may be disposed on a back surface of the support plate SP to support the first support portion SP1. The sub-support plate SSP may be spaced apart from the support unit SU in the first direction DR1. The sub-support plate SSP and the first bottom portion BP1 may be spaced apart from each other by a distance (e.g., a predetermined distance). Although not shown in the drawings, a receiving space in which various kinds of components (e.g., a battery and/or a driving device) are received may be provided between the sub-support plate SSP and the first bottom portion BP1.

Figure 8:
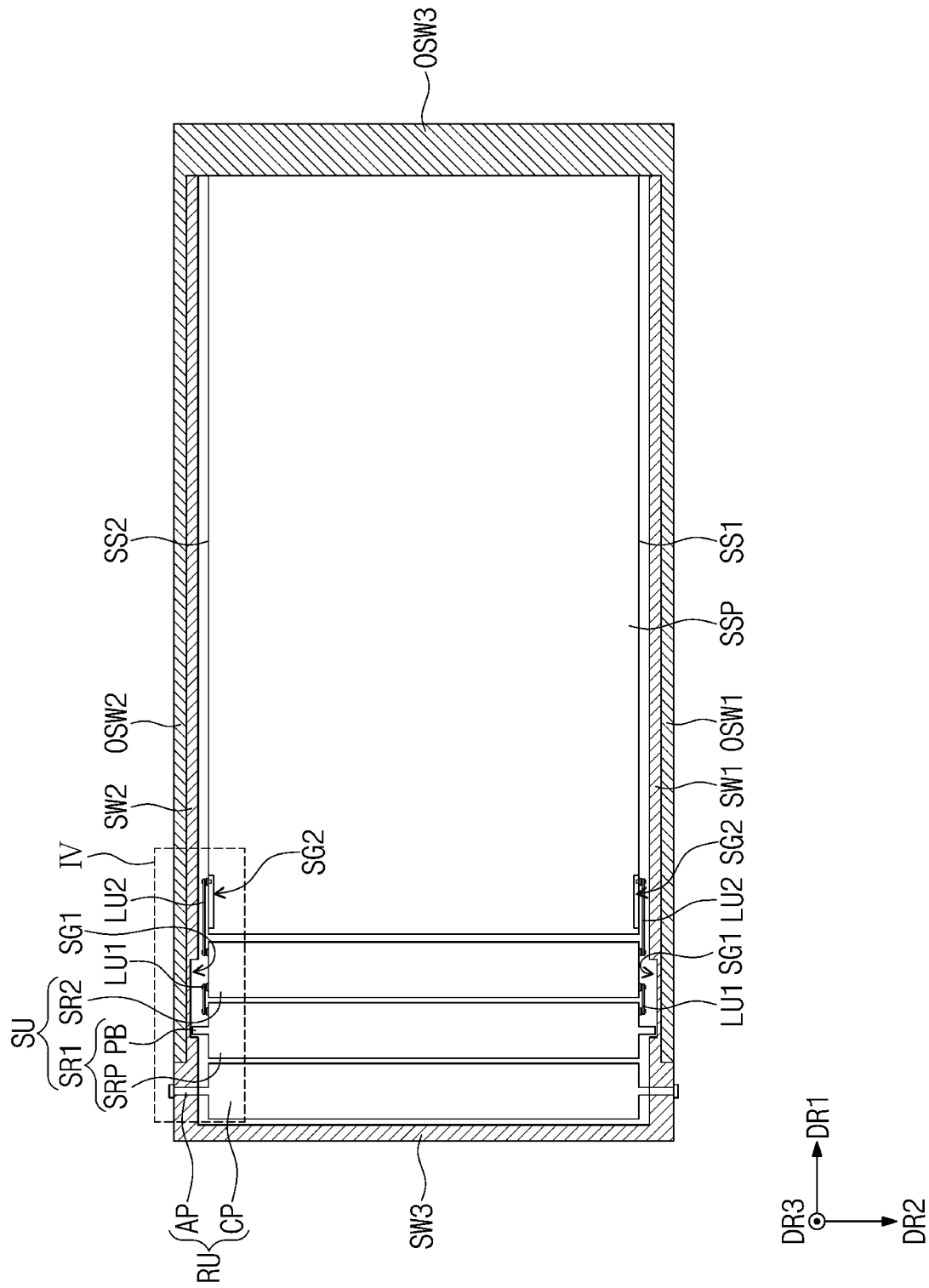
FIG. 8 is a plan view illustrating a first case, a second case, a rotation unit, a support unit, and a link unit in a basic mode, which are coupled to each other.
Figure 9:
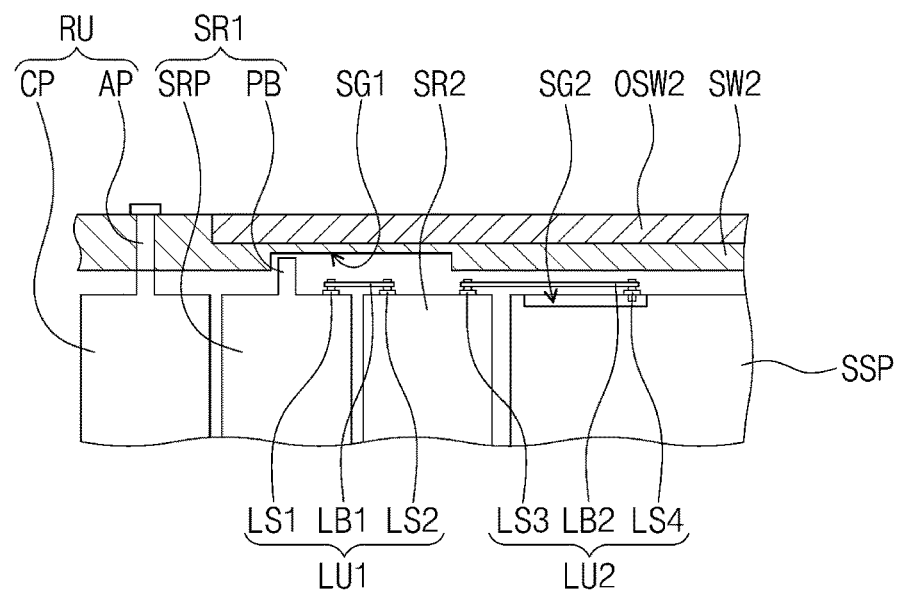
FIG. 9 is an enlarged plan view of a region IV of FIG. 8.

FIG. 8 is a plan view illustrating a first case, a second case, a rotation unit, a support unit, and a link unit in a basic mode, which are coupled to each other; FIG. 9 is an enlarged plan view of a region IV of FIG. 8; and FIG. 10 is a side view illustrating a support unit and a link unit in a basic mode, according to an embodiment of the inventive concepts.

Figure 10:
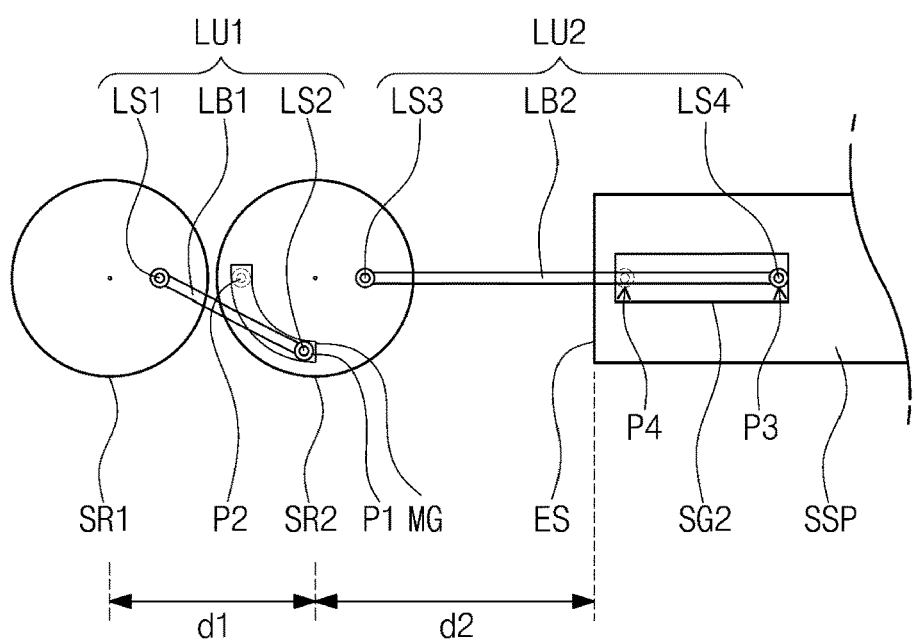
FIG. 10 is a side view illustrating a support unit and a link unit in a basic mode, according to an embodiment of the inventive concepts.

Referring to FIGS. 8 to 10, the display device DD may further include a link unit LU1 and LU2 for moving the support unit SU in the first direction DR1 when the first case CS1 moves in the first direction DR1. The link unit LU1 and LU2 may include a first link unit LU1 and a second link unit LU2.

The first link unit LU1 may link or connect the first support roller SR1 to the second support roller SR2. The first link unit LU1 may include a first link bar LB1, a first fixing portion LS1, and a second fixing portion LS2. The first link bar LB1 may have a bar shape having a desired length. The length of the first link bar LB1 may be set depending on a desired maximum distance between the first and second support rollers SR1 and SR2 spaced apart from each other. First and second fixing holes respectively coupled to the first and second fixing portions LS1 and LS2 may be provided in both, or opposite, end portions of the first link bar LB1.

The first fixing portion LS1 may fix one end portion of the first link bar LB1 to the first support roller SR1. In an embodiment, the first fixing portion LS1 may be a first fixing screw. The first fixing portion LS1 may pass through the first fixing hole of the first link bar LB1 and may be fixed to the first support roller SR1. The first link bar LB1 may be coupled to the first support roller SR1 in such a way that the first link bar LB1 is rotatable in an angle range (e.g., a predetermined angle range).

As illustrated in FIG. 10, the second support roller SR2 may include a movement groove MG for receiving the second fixing portion LS2. The second fixing portion LS2 may move in the movement groove MG. The second support roller SR2 may be linked or connected to the first link bar LB1 by the second fixing portion LS2. A distance between the first and second support rollers SR1 and SR2 may be changed depending on a position of the second fixing portion LS2 in the movement groove MG.

In other words, a distance between the first and second support rollers SR1 and SR2 may be the smallest when the second fixing portion LS2 is located at a first position P1 of the movement groove MG. By contrast, the distance between the first and second support rollers SR1 and SR2 may be the greatest when the second fixing portion LS2 is located at a second position P2 of the movement groove MG. In the basic mode, the second fixing portion LS2 may be located at the first position P1, and, thus, the first and second support rollers SR1 and SR2 may be spaced apart from each other by a first distance d1. Here, the first distance d1 may be defined as a distance between central axes of the first and second support rollers SR1 and SR2.

The movement groove MG may have a linear or curved shape. The movement groove MG having the curved shape is illustrated as an example in FIG. 10. However, embodiments of the inventive concepts are not limited thereto.

The second link unit LU2 may link or connect the sub-support plate SSP and the second support roller SR2 to each other. The second link unit LU2 may include a second link bar LB2, a third fixing portion LS3, and a fourth fixing portion LS4. The second link bar LB2 may have a bar shape having a desired length. The length of the second link bar LB2 may be set depending on a desired maximum distance between the second support roller SR2 and the sub-support plate SSP spaced apart from each other. Third and fourth fixing holes respectively coupled to the third and fourth fixing portions LS3 and LS4 may be provided in both, or opposite, end portions of the second link bar LB2.

The third fixing portion LS3 may fix one end portion of the second link bar LB2 to the second support roller SR2. In an embodiment, the third fixing portion LS3 may be a second fixing screw. The third fixing portion LS3 may pass through the third fixing hole of the second link bar LB2 and may be fixed to the second support roller SR2.

Referring again to FIGS. 8 to 10, the sub-support plate SSP may include first and second side surfaces SS1 and SS2 that face the inner side surfaces of the first and second sidewall portions SW1 and SW2, respectively. Each of the first and second side surfaces SS1 and SS2 may have a second stopping groove SG2 in a side portion thereof adjacent to the second support roller SR2. In other words, the second stopping grooves SG2 may be provided in the first and second side surfaces SS1 and SS2 of the sub-support plate SSP, respectively.

The fourth fixing portion LS4 may be received in the second stopping groove SG2. The fourth fixing portion LS4 may move in the second stopping groove SG2 in the first direction DR1. The sub-support plate SSP may be connected to the second link bar LB2 by the fourth fixing portion LS4. A distance between the sub-support plate SSP and the second support roller SR2 may be changed depending on a position of the fourth fixing portion LS4 in the second stopping groove SG2.

The distance between the second support roller SR2 and the sub-support plate SSP may be the smallest when the fourth fixing portion LS4 is located at a third position P3 of the second stopping groove SG2. By contrast, the distance between the second support roller SR2 and the sub-support plate SSP may be the greatest when the fourth fixing portion LS4 is located at a fourth position P4 of the second stopping groove SG2. In the basic mode, the fourth fixing portion LS4 may be located at the third position P3, and, thus, the second support roller SR2 and the sub-support plate SSP may be spaced apart from each other by a second distance d2. Here, the second distance d2 may be defined as a distance between the central axis of the second support roller SR2 and an end surface ES of the sub-support plate SSP.

Figure 11:
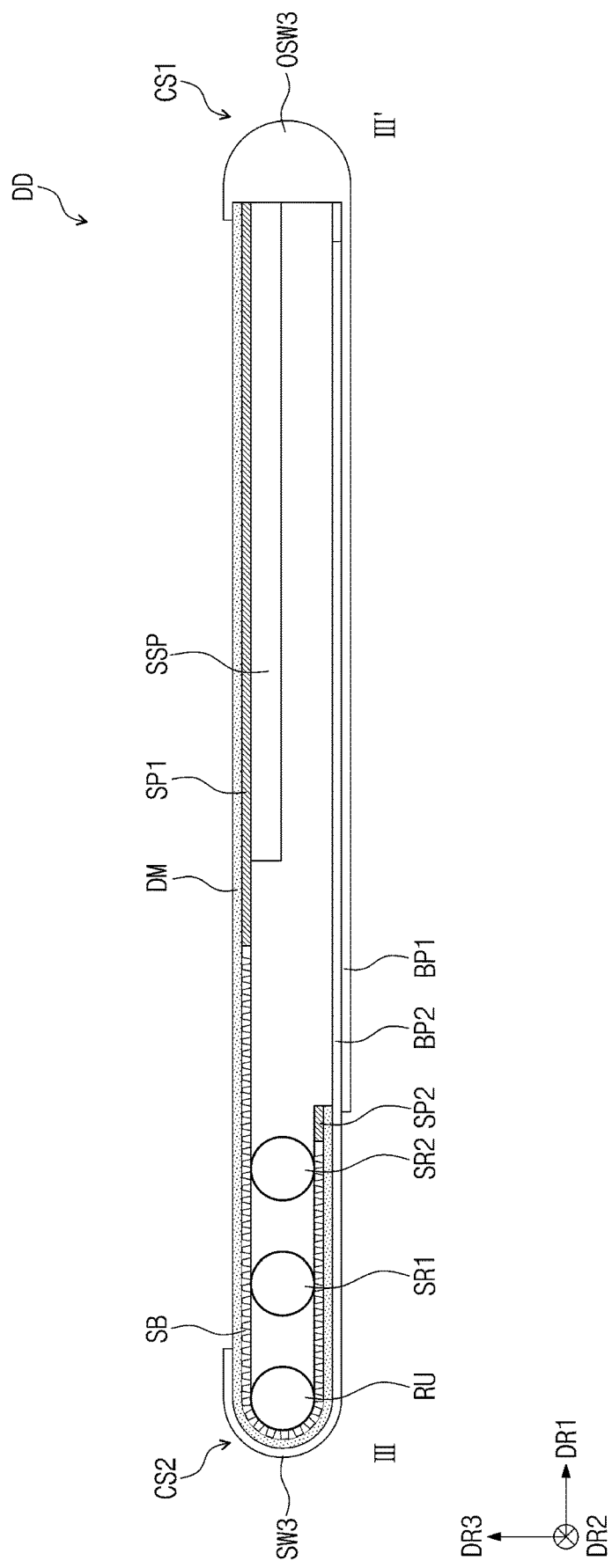
FIG. 11 is a cross-sectional view taken along the line III-III' of FIG. 2.
Figure 12:
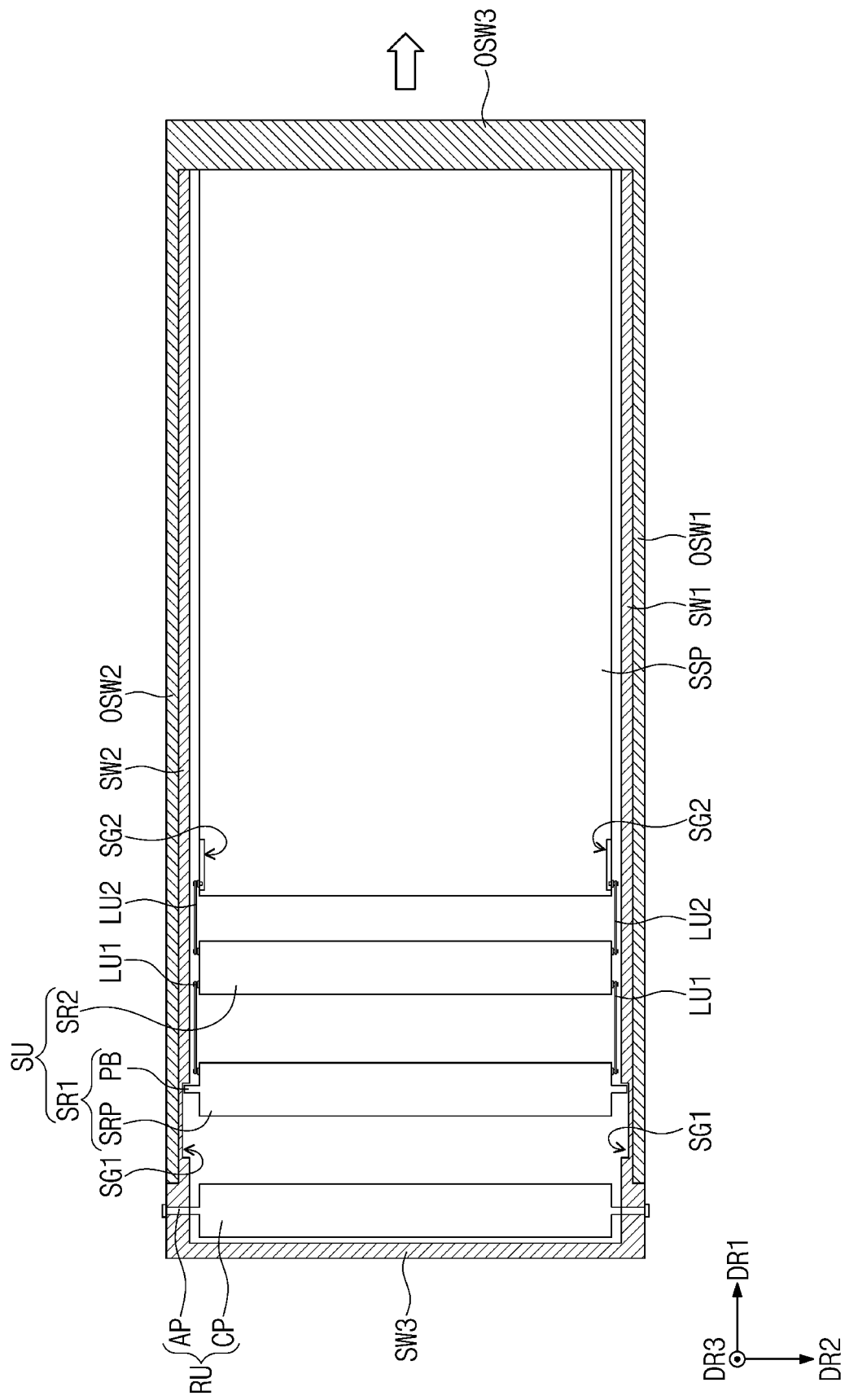
FIG. 12 is a plan view illustrating a first case, a second case, a rotation unit, and a support unit in an expanded mode, which are coupled to each other.
Figure 13:
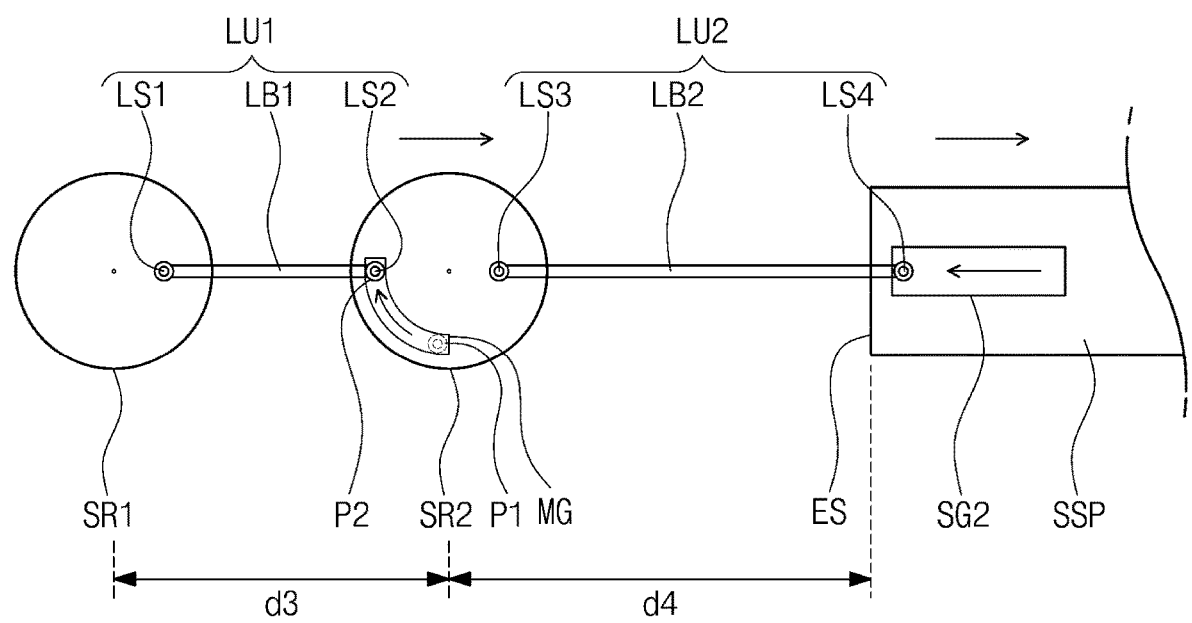
FIG. 13 is a side view illustrating a support unit and a link unit in an expanded mode, according to an embodiment of the inventive concepts.

FIG. 11 is a cross-sectional view taken along the line III-III' of FIG. 2; FIG. 12 is a plan view illustrating a first case, a second case, a rotation unit, and a support unit in an expanded mode, which are coupled to each other; and FIG. 13 is a side view illustrating a support unit and a link unit in an expanded mode, according to an embodiment of the inventive concepts.

Referring to FIGS. 2 and 11 to 13, in the expanded mode, the first case CS1 may move in the first direction DR1. When the first case CS1 moves in the first direction DR1, the display module DM and the support plate SP which are fixedly coupled to the first case CS1 may move in the first direction DR1. Thus, the screen of the display module DM which is exposed through the opening OP may be expanded. In other words, the screen of the display module DM may include the first area AA1 and a portion of the second area AA2 in the expanded mode.

The second area AA2 of the display module DM which is exposed through the opening OP may be supported by a plurality of the support bars SB. In the expanded mode, the plurality of support bars SB may be supported by the support unit SU. When the first case CS1 moves in the first direction DR1 in the expanded mode, the sub-support plate SSP may move in the first direction DR1 along with the first case CS1. In addition, the support unit SU may also move in the first direction DR1 by the movement of the first case CS1 to support the plurality of support bars SB.

In further detail, the second support roller SR2 connected to the sub-support plate SSP through the second link unit LU2 may move in the first direction DR1, and the first support roller SR1 connected to the second support roller SR2 through the first link unit LU1 may move in the first direction DR1. A position of the fourth fixing portion LS4 may be changed from the third position P3 to the fourth position P4 by the movement of the sub-support plate SSP, and, thus, the distance between the sub-support plate SSP and the second support roller SR2 may be increased. In addition, a position of the second fixing portion LS2 may be changed from the first position P1 to the second position P2 by the movement of the second support roller SR2, and, thus, the distance between the first and second support rollers SR1 and SR2 may be increased.

In other words, the first and second support rollers SR1 and SR2 may be spaced apart from each other by the first distance d1 (see FIG. 10) in the basic mode, and the first and second support rollers SR1 and SR2 may be spaced apart from each other by a third distance d3 greater than the first distance d1 in the expanded mode.

The sub-support plate SSP and the second support roller SR2 may be spaced apart from each other by the second distance d2 (see FIG. 10) in the basic mode, and the sub-support plate SSP and the second support roller SR2 may be spaced apart from each other by a fourth distance d4 greater than the second distance d2 in the expanded mode.

Even though the support bars SB move in the first direction DR1 in the expanded mode, the support bars SB may be stably supported by the first and second support rollers SR1 and SR2. Thus, in the expanded mode, the second area AA2 (see FIG. 3) of the display module DM which is exposed through the opening OP may be supported by the first and second support rollers SR1 and SR2 as well as the support bars SB. As a result, an effect of supporting the display module DM may be improved.

In an embodiment, as shown in FIGS. 1 to 13, the support unit SU includes two support rollers SR1 and SR2. However, a number of the support rollers included in the support unit SU is not limited thereto.

Figure 14:
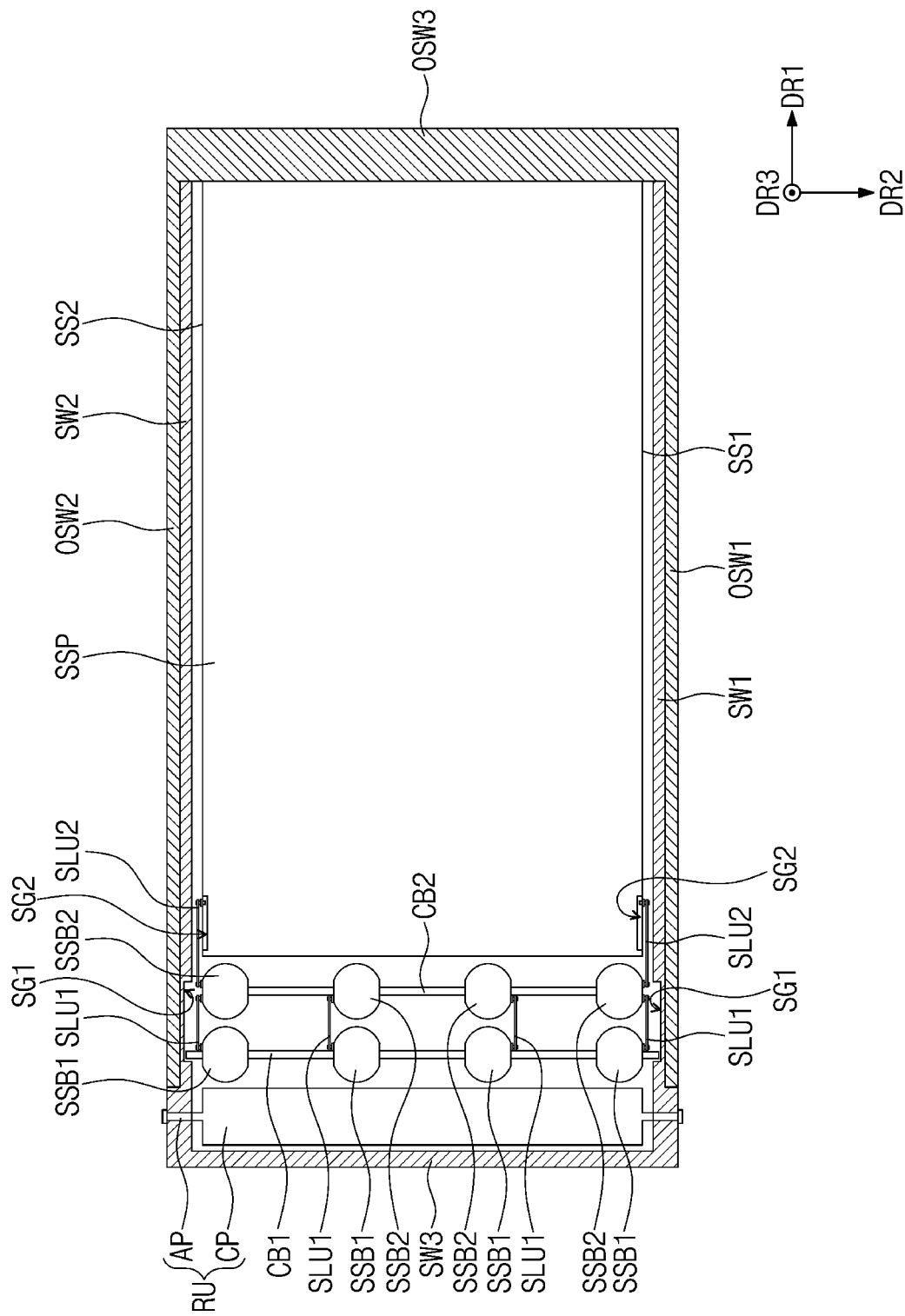
FIG. 14 is a plan view illustrating a coupled state of a first case, a second case, a rotation unit, and a support unit in a basic mode, according to an embodiment of the inventive concepts.
Figure 15:
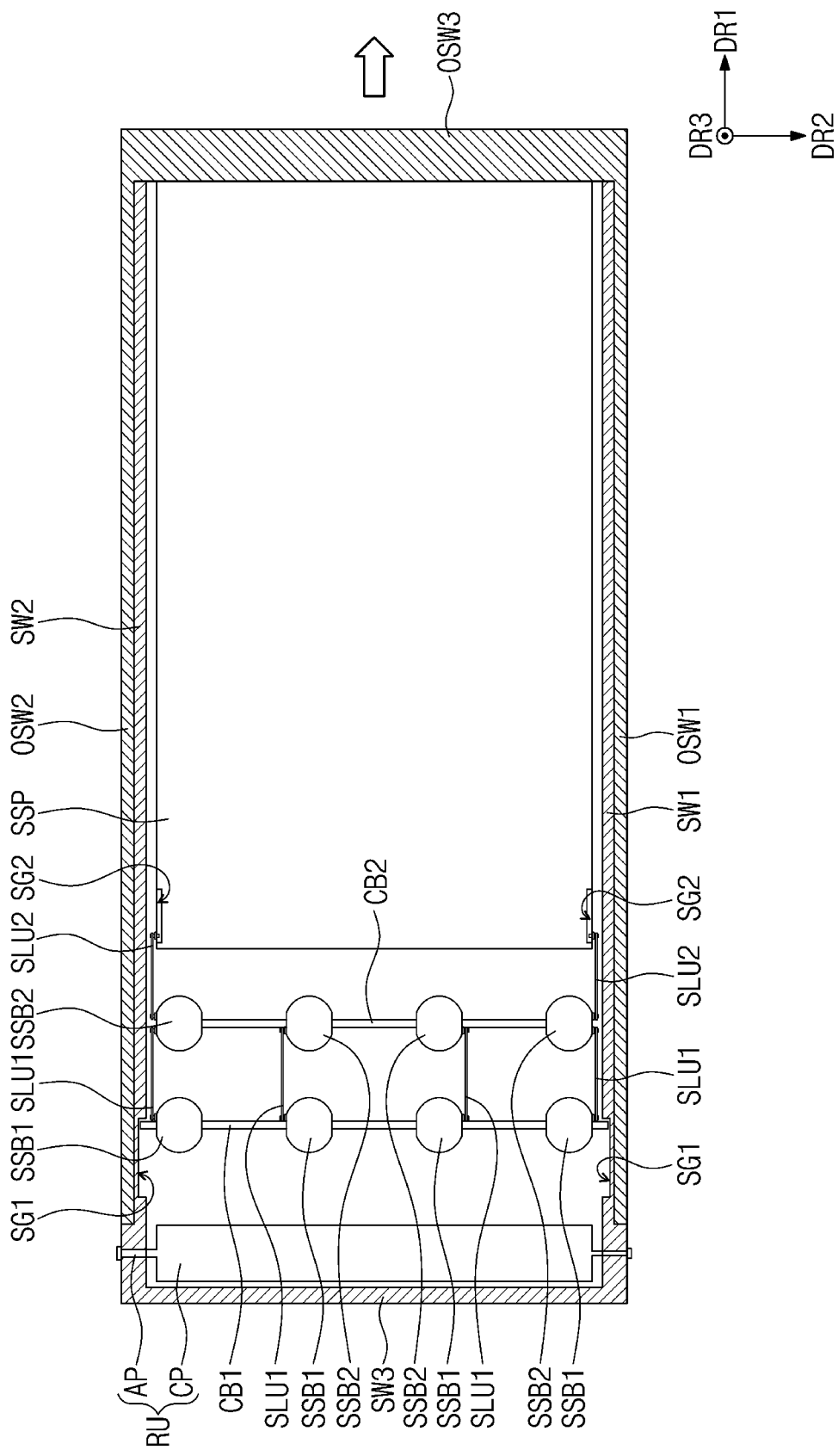
FIG. 15 is a plan view illustrating a coupled state of a first case, a second case, a rotation unit, and a support unit in an expanded mode, according to an embodiment of the inventive concepts.

FIG. 14 is a plan view illustrating a coupled state of a first case, a second case, a rotation unit, and a support unit in a basic mode, according to an embodiment of the inventive concepts; and FIG. 15 is a plan view illustrating a coupled state of a first case, a second case, a rotation unit, and a support unit in an expanded mode, according to an embodiment of the inventive concepts.

Referring to FIG. 14, a support unit SU according to an embodiment of the inventive concepts may include a plurality of first support balls SSB1 and a plurality of second support balls SSB2. The plurality of first support balls SSB1 may be arranged at equal distances in the second direction DR2 while being spaced apart from each other. The plurality of second support balls SSB2 may be arranged at equal distances in the second direction DR2 while being spaced apart from each other.

The support unit SU may include first and second connection bars CB1 and CB2. The plurality of first support balls SSB1 may be coupled to the first connection bar CB1. The plurality of second support balls SSB2 may be coupled to the second connection bar CB2.

A first stopping groove SG1 may be provided in each of the first and second sidewall portions SW1 and SW2 of the second case CS2. The first stopping grooves SG1 may receive the first connection bar CB1. In further detail, the first stopping groove SG1 of the first sidewall portion SW1 may receive one end of the first connection bar CB1, and the first stopping groove SG1 of the second sidewall portion SW2 may receive another end of the first connection bar CB1. Thus, the first stopping grooves SG1 may function as a stop for limiting movement of the plurality of first support balls SSB1.

The display device DD may further include a link unit SLU1 and SLU2 for moving the support unit SU in the first direction DR1 when the first case CS1 moves in the first direction DR1. The link unit SLU1 and SLU2 may include a plurality of first link units SLU1 and a plurality of second link units SLU2.

The plurality of first link units SLU1 may link or connect the plurality of first support balls SSB1 to the plurality of second support balls SSB2. In other words, each of the plurality of first link units SLU1 may link or connect a corresponding one of the plurality of first support balls SSB1 to a corresponding one of the plurality of second support balls SSB2. In an embodiment, each of the plurality of first link units SLU1 may have a same structure as the first link unit LU1 illustrated in FIGS. 8 to 13.

The second link units SLU2 may link or connect the sub-support plate SSP to the plurality of second support balls SSB2. In particular, the second link units SLU2 may be coupled to two outermost support balls of the plurality of second support balls SSB2, which are adjacent to the first and second side surfaces SS1 and SS2 of the sub-support plate SSP, respectively. In an embodiment, the second link unit SLU2 may have a same structure as the second link unit LU2 illustrated in FIGS. 8 to 13.

Second stopping grooves SG2 adjacent to the plurality of second support balls SSB2 may be provided in the first and second side surfaces SS1 and SS2 of the sub-support plate SSP. A portion of the second link unit SLU2 may be received in the second stopping groove SG2 and may be movable in the first direction DR1 in the second stopping groove SG2.

Referring to FIGS. 2 and 15, in the expanded mode, the first case CS1 may move in the first direction DR1. When the first case CS1 moves in the first direction DR1, the display module DM and the support plate SP which are fixedly coupled to the first case CS1 may move in the first direction DR1. Thus, the screen of the display module DM which is exposed through the opening OP may be expanded.

In the expanded mode, the second area AA2 of the display module DM may move in the first direction DR1 along with the first case CS1, and, thus, an area (or size) of the second area AA2 overlapping with the opening OP may be increased. The second area AA2 of the display module DM which is exposed through the opening OP may be supported by a plurality of the support bars SB. In the expanded mode, the plurality of support bars SB may be supported by the plurality of first and second support balls SSB1 and SSB2. When the first case CS1 moves in the first direction DR1 in the expanded mode, the sub-support plate SSP may move in the first direction DR1 along with the first case CS1. In addition, the plurality of second support balls SSB2 coupled to the sub-support plate SSP by the second link units SLU2 may also move in the first direction DR1 along with the first case CS1, and the plurality of first support balls SSB1 coupled to the plurality of second support balls SSB2 by the plurality of first link units SLU1 may also move in the first direction DR1. Thus, a distance between the plurality of first support balls SSB1 and the plurality of second support balls SSB2 may be increased, and, thus, the support bars SB moved in the first direction DR1 may be stably supported by the first and second support balls SSB1 and SSB2.

Thus, in the expanded mode, the second area AA2 (see FIG. 3) of the display module DM which is exposed through the opening OP may be supported by the plurality of first and second support balls SSB1 and SSB2 as well as the support bars SB. As a result, an effect of supporting the display module DM may be improved.

In an embodiment, as shown in FIGS. 14 and 15, the plurality of first support balls includes four support balls SSB1, and the plurality of second support balls includes four support balls SSB2. However, the number of the support balls, a distance between the support balls, and the arrangement of the support balls are not limited thereto.

Figure 16:
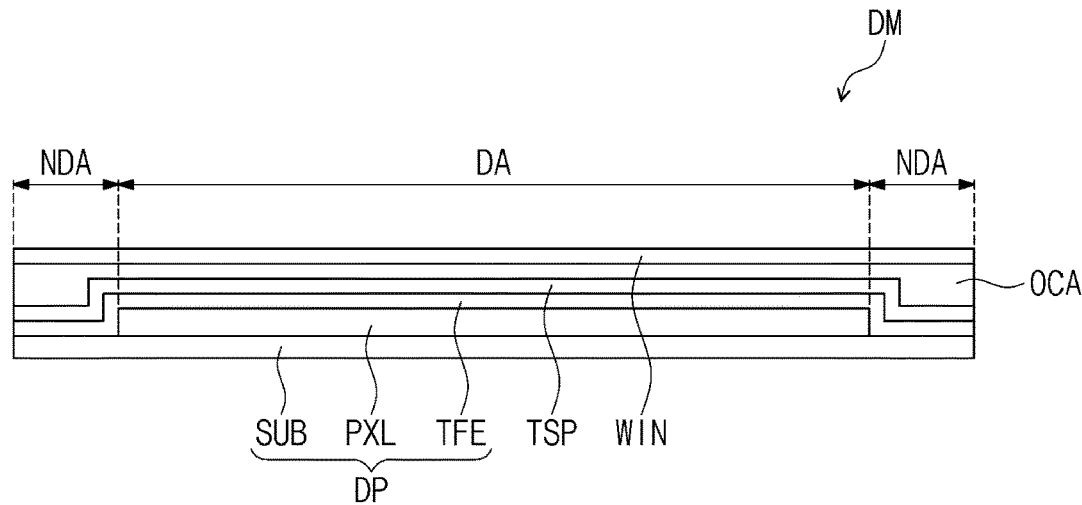
FIG. 16 is a cross-sectional view schematically illustrating the display module of FIG. 1.
Figure 17:
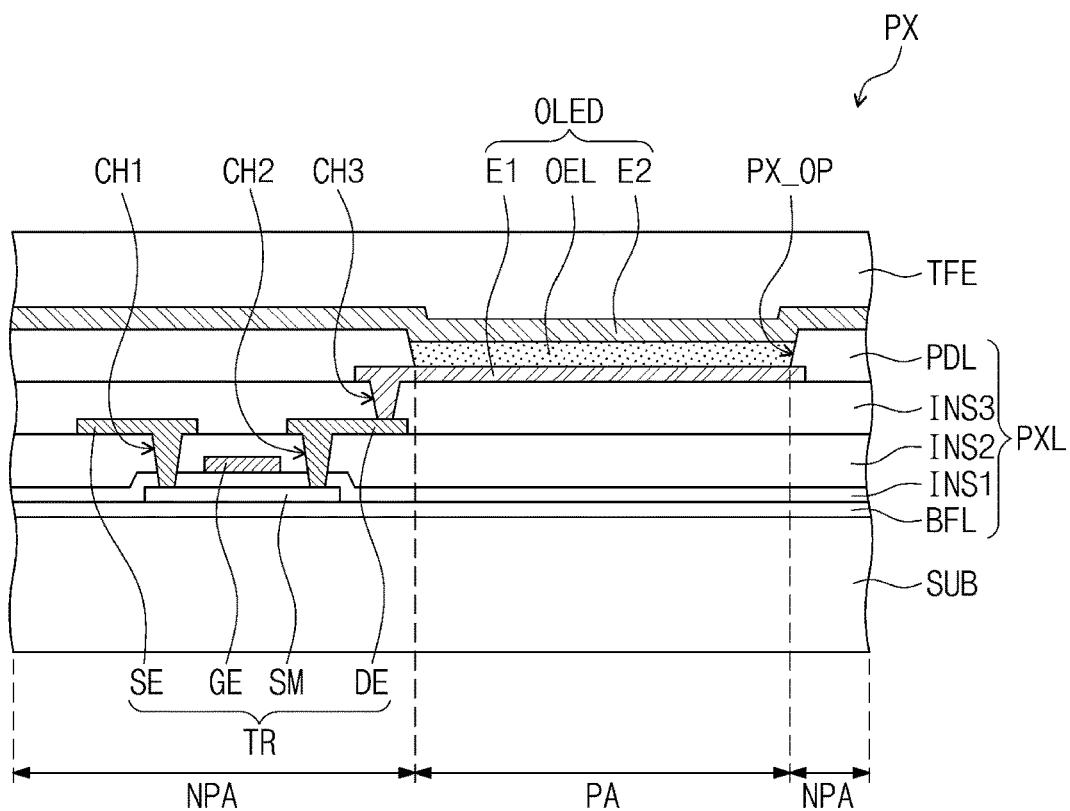
FIG. 17 is an enlarged cross-sectional view illustrating a display panel according to an embodiment of the inventive concepts.

FIG. 16 is a cross-sectional view schematically illustrating the display module of FIG. 1; and FIG. 17 is an enlarged cross-sectional view illustrating a display panel according to an embodiment of the inventive concepts.

Referring to FIG. 16, in an embodiment, the display module DM may include a display panel DP, a touch sensing unit TSP disposed on the display panel DP, a window WIN disposed on the touch sensing unit TSP, and an adhesive layer OCA disposed between the touch sensing unit TSP and the window WIN.

In an embodiment, the display panel DP may be an organic light emitting display panel. However, embodiments of the inventive concepts are not limited thereto. In certain embodiments, the display panel DP may be any of other various display panels capable of displaying images, such as a liquid crystal display panel, an electrowetting display panel, and an electrophoretic display panel. The display panel DP may be a flexible display panel.

The display panel DP may include a substrate SUB, a pixel layer PXL disposed on the substrate SUB, and a thin film encapsulation layer TFE disposed on the substrate SUB to cover the pixel layer PXL. In an embodiment, the substrate SUB may be a transparent substrate and may include a flexible plastic substrate. For example, the substrate SUB may include polyimide (PI).

The substrate SUB may include a display area DA and a non-display area NDA around the display area DA. The pixel layer PXL may be disposed on the display area DA. The pixel layer PXL may include a plurality of pixels, and each of the pixels may include a light emitting element.

In an embodiment, the thin film encapsulation layer TFE may include at least two inorganic layers and an organic layer disposed between the inorganic layers. The inorganic layers may include an inorganic material and may protect the pixel layer PXL from moisture/oxygen. The organic layer may include an organic material and may protect the pixel layer PXL from a foreign material, such as dust particles.

The touch sensing unit TSP may be disposed on the thin film encapsulation layer TFE. The touch sensing unit TSP may sense an external input (e.g., a user's hand or finger or a touch pen) and may convert the external input into an input signal. The touch sensing unit TSP may include a plurality of sensing electrodes for sensing the external input. In an embodiment, the sensing electrodes may sense the external input by a capacitive method.

In an embodiment, the touch sensing unit TSP may be manufactured directly on the thin film encapsulation layer TFE when the display module DM is manufactured. However, embodiments of the inventive concepts are not limited thereto. In another embodiment, the touch sensing unit TSP may be manufactured as a touch panel separated from the display panel DP and may be adhered to the display panel DP by an adhesive.

The window WIN may protect the display panel DP and the touch sensing unit TSP from external scratches and impact. The window WIN may be adhered to the touch sensing unit TSP by the adhesive layer OCA. The adhesive layer OCA may include an optical clear adhesive. An image generated from the display panel DP may be transmitted through the window WIN so as to be shown to a user.

As illustrated in FIG. 17, each pixel PX according to an embodiment of the inventive concepts may include an organic light emitting element OLED and a transistor TR connected to the organic light emitting element OLED. The organic light emitting element OLED may include a first electrode E1, a second electrode E2, and an organic emission layer OEL disposed between the first electrode E1 and the second electrode E2. In an embodiment, the first electrode E1 may be an anode, and the second electrode E2 may be a cathode.

The pixel PX may be divided into a pixel area PA and a non-pixel area NPA around the pixel area PA. The organic light emitting element OLED may be disposed in the pixel area PA, and the transistor TR may be disposed in the non-pixel area NPA.

The transistor TR and the organic light emitting element OLED may be disposed on the substrate SUB. A buffer layer BFL may be disposed on the substrate SUB. The buffer layer BFL may include an inorganic material. A semiconductor layer SM of the transistor TR may be disposed on the buffer layer BFL. The semiconductor layer SM may include an inorganic semiconductor material (e.g., amorphous silicon or poly-crystalline silicon) or an organic semiconductor material. In an embodiment, the semiconductor layer SM may include an oxide semiconductor material.

Although not shown in FIG. 17, the semiconductor layer SM may include a source region, a drain region, and a channel region between the source region and the drain region.

A first insulating layer INS1 may be disposed on the buffer layer BFL to cover the semiconductor layer SM. The first insulating layer INS1 may include an inorganic material. A gate electrode GE of the transistor TR may be disposed on the first insulating layer INS1 and may overlap with the semiconductor layer SM. The gate electrode GE may be disposed to overlap with the channel region of the semiconductor layer SM.

A second insulating layer INS2 may be disposed on the first insulating layer INS1 to cover the gate electrode GE. The second insulating layer INS2 may be defined as an interlayer insulating layer. The second insulating layer INS2 may include an organic material and/or an inorganic material.

A source electrode SE and a drain electrode DE of the transistor TR may be spaced apart from each other on the second insulating layer INS2. The source electrode SE may be connected to the source region of the semiconductor layer SM through a first contact hole CH1 penetrating the first and second insulating layers INS1 and INS2. The drain electrode DE may be connected to the drain region of the semiconductor layer SM through a second contact hole CH2 penetrating the first and second insulating layers INS1 and INS2.

A third insulating layer INS3 may be disposed on the second insulating layer INS2 to cover the source electrode SE and the drain electrode DE of the transistor TR. The third insulating layer INS3 may be defined as a planarization layer providing a flat top surface and may include an organic material.

The first electrode E1 may be disposed on the third insulating layer INS3. The first electrode E1 may be connected to the drain electrode DE of the transistor TR through a third contact hole CH3 penetrating the third insulating layer INS3. The first electrode E1 may be defined as a pixel electrode.

A pixel defining layer PDL exposing a portion of the first electrode E1 may be disposed on the first electrode E1 and the third insulating layer INS3. An opening PX_OP exposing the portion of the first electrode E1 may be defined in the pixel defining layer PDL.

The organic emission layer OEL may be disposed on the first electrode E1 in the opening PX_OP. In an embodiment, the organic emission layer OEL may generate one of red light, green light, and blue light. However, embodiments of the inventive concepts are not limited thereto. In other embodiments, the organic emission layer OEL may generate white light by a combination of organic materials generating red light, green light, and blue light.

The second electrode E2 may be disposed on the pixel defining layer PDL and the organic emission layer OEL. The second electrode E2 may be defined as a common electrode.

The thin film encapsulation layer TFE may be disposed on the organic light emitting element OLED to cover the pixel PX. A layer between the substrate SUB and the thin film encapsulation layer TFE may be defined as the pixel layer PXL.

A first voltage (ELVDD) may be applied to the first electrode E1, and a second voltage (ELVSS) may be applied to the second electrode E2. Holes and electrons injected in the organic emission layer OEL may be combined with each other to generate excitons, and the excitons may transition from an excited state to a ground state to emit light from the organic light emitting element OLED. The organic light emitting element OLED may emit one of the red light, the green light, and the blue light by a flow of the current, and thus an image may be displayed.

FIG. 17 illustrates the structure of the pixel according to an embodiment of the inventive concepts. However, the structure of the pixel of the inventive concepts is not limited thereto.

According to embodiments of the inventive concepts, even though the plurality of support bars moves in the first direction in the expanded mode, the plurality of support bars may be stably supported by the support unit. Thus, the effect of supporting the display module may be improved in the expanded mode.

While the inventive concepts have been described with reference to some example embodiments, it will be apparent to those skilled in the art that various changes and modifications may be made without departing from the spirits and scope of the inventive concepts. Therefore, it should be understood that the above embodiments are not limiting, but illustrative. Thus, the scope of the inventive concepts is to be determined by the broadest permissible interpretation of the claims and their equivalents, and shall not be restricted or limited by the foregoing description.

What is claimed is:

1. A display device comprising:
a display module comprising a first area and a second area;
a support plate on a back surface of the display module, the support plate comprising a first support portion supporting the first area of the display module, and a plurality of support bars spaced apart from the first support portion in a first direction to support the second area, the plurality of support bars extending in a second direction intersecting the first direction;
a case receiving the display module and the support plate and configured to control a size of an opening, exposing the display module, by a sliding operation; and
a support unit coupled to the case and movable along the display module in the sliding operation,
wherein the support unit overlaps the plurality of support bars in a third direction substantially perpendicular to the first and second directions to directly support some of the plurality of support bars.

2. The display device of claim 1, wherein the case comprises:
a first case to which the display module and the support plate are fixedly coupled; and
a second case coupled to the first case to move in a direction away from or closer to the first case, which is parallel to the first direction, wherein the support unit is coupled to the second case.

3. A display device comprising:
a display module comprising a first area and a second area;
a support plate on a back surface of the display module, the support plate comprising a first support portion supporting the first area of the display module, and a plurality of support bars supporting the second area;
a case receiving the display module and the support plate and configured to control a size of an opening, exposing the display module, by a sliding operation; and
a support unit coupled to the case and movable along the display module in the sliding operation to support the plurality of support bars,
wherein the case comprises:
a first case to which the display module and the support plate are fixedly coupled; and
a second case coupled to the first case to move in a direction away from or closer to the first case, which is parallel to a first direction, wherein the support unit is coupled to the second case, and
wherein the support unit comprises a plurality of support rollers supporting the plurality of support bars.

4. The display device of claim 3, wherein a distance between support rollers of the plurality of support rollers increases when the first case moves in a direction away from the second case, and
wherein the distance between the support rollers decreases when the first case moves in a direction closer to the second case.

5. The display device of claim 3, wherein the second case comprises a sidewall portion slidingly coupled to the first case, and
the sidewall portion comprises a first stopping groove extending in the first direction.

6. The display device of claim 5, wherein at least one of the plurality of support rollers comprises:
a support pillar portion extending in a second direction perpendicular to the first direction; and
a protrusion portion protruding from each of opposite ends of the support pillar portion,
wherein the protrusion portion is received in the first stopping groove and is movable in the first direction in the first stopping groove.

7. The display device of claim 3, further comprising a first link unit linking at least two support rollers of the plurality of support rollers to each other.

8. The display device of claim 7, wherein the first link unit comprises:
a first link bar;
a first fixing portion connecting the first link bar to a first support roller of two support rollers adjacent to each other of the plurality of support rollers; and
a second fixing portion connecting the first link bar to a second support roller of the two support rollers.

9. The display device of claim 8, wherein the second support roller comprises a movement groove receiving the second fixing portion, and
wherein a distance between the first and second support rollers is adjusted depending on a position of the second fixing portion in the movement groove.

10. The display device of claim 3, wherein the first case comprises:
an outer sidewall portion slidingly coupled to the second case; and
a sub-support plate supporting the first support portion of the support plate.

11. The display device of claim 10, further comprising a second link unit linking the sub-support plate to an adjacent support roller of the plurality of support rollers, which is closest to the sub-support plate.

12. The display device of claim 11, wherein the second link unit comprises:
a second link bar;
a third fixing portion connecting the second link bar to the adjacent support roller; and
a fourth fixing portion connecting the second link bar to the sub-support plate.

13. The display device of claim 12, wherein the sub-support plate comprises a second stopping groove receiving the fourth fixing portion, and wherein a distance between the adjacent support roller and the sub-support plate is adjusted depending on a position of the fourth fixing portion in the second stopping groove.

14. A display device comprising:

a display module comprising a first area and a second area;

a support plate on a back surface of the display module, the support plate comprising a first support portion supporting the first area of the display module, and a plurality of support bars supporting the second area;

a case receiving the display module and the support plate and configured to control a size of an opening, exposing the display module, by a sliding operation; and a support unit coupled to the case and movable along the display module in the sliding operation to support the plurality of support bars, wherein the case comprises:

a first case to which the display module and the support plate are fixedly coupled; and a second case coupled to the first case to move in a direction away from or closer to the first case, which is parallel to a first direction, wherein the support unit is coupled to the second case, and wherein the support unit comprises a plurality of support balls supporting the plurality of support bars.

15. The display device of claim 14, wherein the support unit further comprises a plurality of connection bars extending in a second direction perpendicular to the first direction, and wherein the plurality of support balls is coupled to each of the plurality of connection bars.

16. The display device of claim 15, wherein the second case comprises a sidewall portion slidingly coupled to the first case, and wherein the sidewall portion comprises a first stopping groove extending in the first direction.

17. The display device of claim 16, wherein connection bars of the plurality of connection bars are connected to each other through the support balls, and wherein a first connection bar of the plurality of connection bars is received in the first stopping groove and is movable in the first direction in the first stopping groove.

18. The display device of claim 16, further comprising a first link unit linking the support balls to each other in the first direction.

19. The display device of claim 18, wherein the first case comprises:

an outer sidewall portion slidingly coupled to the second case; and a sub-support plate supporting the first support portion of the support plate.

20. The display device of claim 19, further comprising a second link unit linking the sub-support plate to the plurality of support balls coupled to a connection bar, closest to the sub-support plate, of the plurality of connection bars.

* * * * *